Figure 1:
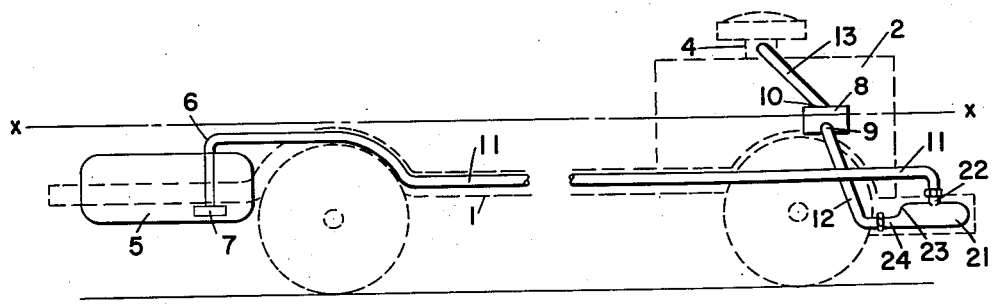

Jan. 24, 1961    J. M. JORDAN    2,969,110
FUEL DELIVERY SYSTEM FOR AUTOMOTIVE VEHICLES
Filed March 12, 1959

John M. Jordan    INVENTOR

BY W. O. Heilman

ATTORNEY

United States Patent Office 2,969,110
Patented Jan. 24, 1961

2,969,110

FUEL DELIVERY SYSTEM FOR AUTOMOTIVE VEHICLES

John Milton Jordan, Plainfield, N.J., assignor to Esso Research and Engineering Company, a corporation of Delaware Filed Mar. 12, 1959, Ser. No. 798,956

5 Claims. (Cl. 158—36.4)

The present invention relates to an apparatus adapted to minimize the occurrence of vapor lock in the fuel delivery system of an engine for the propulsion of automotive vehicles. In particular, the invention relates to such apparatus employed in the fuel delivery system for an automobile engine, using volatile liquid fuels such as gasoline. More specifically, the invention relates to an apparatus for minimizing vapor-lock conditions whether caused by excessive vaporization of the liquid fuel, or induced and aggravated by the inertial effect of sudden, forward acceleration.

Vapor lock, for the purpose of the present description, may generally be defined as a condition in which the capacity of a fuel delivery system, including the fuel pump therein, is reduced to the point where either the supply of liquid fuel to the pump is completely blocked by vapors formed in the system, or where the supply is so reduced by excessive vaporization as to reduce the liquid volume supplied to the carburetor to a level below that required to maintain an adequate fuel-air ratio in the engine combustion chambers. Ordinarily, vapor lock is the result of excessively high temperatures in the fuel delivery system, such as may be produced by extended idle operation of the vehicle engine, or by extended periods of operation at high speed, or high load running. The condition is manifested by stalling and hard starting, particularly when fuel in the system is subjected to "heat soaking" in the engine compartment, at temperatures approximating the boiling points of the lower boiling fuel component fractions. Further manifestations of the condition are loss of power, and misfiring.

The vapor-lock conditions, caused by high operating temperatures, may be severely aggravated by the inertial effect on liquid fuel in the system resulting from sudden starts and rapid acceleration. In sudden starts and with rapid acceleration, the inertia of the liquid in the system opposes pump suction, and prevents fuel flow to the pump in the proper and required volume. This inertial effect is particularly significant at levels of incipient vapor lock, but aggravates vapor-lock conditions under any circumstance.

It is an object of the present invention to provide means whereby the inertial effect of acceleration is utilized to improve rather than reduce delivery of liquid fuel to the fuel pump in an automotive vehicle fuel delivery system. It is a further object of this invention to overcome some deficiencies of the conventional fuel delivery system, whereby to reduce rather than aggravate the effect of high operating temperatures on the fuel delivery system.

Figure 2:
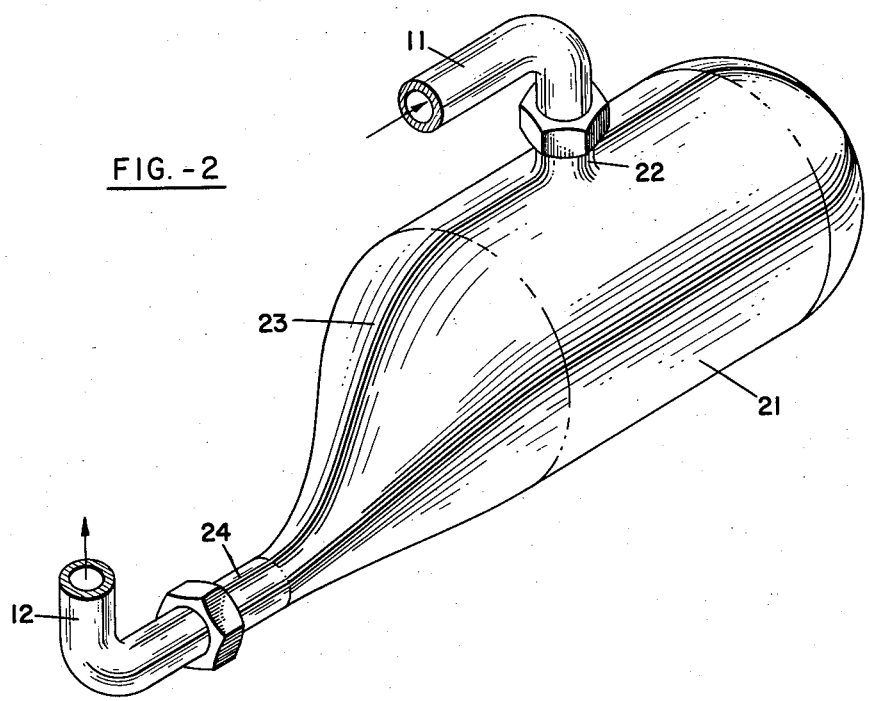

The invention and its objects may be more fully understood from the following description, when it is read with reference to the accompanying drawings, wherein:

Fig. 1 is a schematic showing of a fuel delivery system according to the present invention, including a liquid fuel pump, a storage tank for liquid fuel, and a liquid fuel delivery conduit, all with reference to an automobile chassis, and with parts broken away or in section; and Fig. 2 is a perspective view of a featured part of the fuel delivery conduit as shown in Fig. 1.

Referring now to the drawing in greater detail, the numeral 1 designates an automobile chassis. In the drawing, the chassis is shown in dotted lines to provide points of reference, including front and rear ends, and with a central portion omitted. The longitudinal axis of the chassis is indicated as extending along the dotted line X—X. An internal combustion engine 2, having a carburetor 4, is conventionally disposed at the front end of the chassis.

The numeral 5 designates a liquid fuel storage tank conventionally located at the rear end of the chassis 1, and having an outlet connection 6 communicating with a typical intake device 7 located within the tank. At the other end of the fuel delivery system, the numeral 8 designates the representation of a liquid fuel pump having an inlet connection 9 and an outlet connection 10, the outlet connection 10 being connected in turn by means of the conduit 13 to the fuel inlet of the carburetor 4, represented in the drawing by dotted lines.

The fuel pump 8 is connected to the outlet 6 of tank 5 by means of a conduit system including a first conduit section 11 connected in liquid delivery communication with said tank, and a second conduit section 12 connected in liquid delivery communication between the pump inlet 9 and an auxiliary fuel storage vessel or chamber 21. This fuel storage vessel or chamber in effect constitutes an enlarged portion of the conduit system. It is provided with an inlet 22 through an upper wall surface portion thereof which is adapted for connected communication with the first conduit section 11. The conduit section 11, as shown, has a portion omitted, substantially as does the chassis 1.

Preferably, the vessel 21 is disposed in a location forwardly of the liquid fuel pump 8, and with its longitudinal axis substantially aligned with the longitudinal axis of the vehicle. An outlet from the vessel 21 is provided by means of a substantially eccentric funnel-like, end wall 23 disposed so as to extend in the direction of the tank 5. The end wall 23 terminates in an outlet connection 24 adapted for connected communication with the fuel conduit section 12. If desired, the outer wall portions of the vessel 21 may be provided with cooling fins.

In operation of the engine, and thereby the pump 8, liquid fuel is drawn from the tank 5 by way of the first conduit section 11 into the auxiliary storage vessel, filling the vessel. Thence the fuel is drawn through the vessel outlet 24 through the second conduit connection 12 into the pump. By reason of its location in a forward position, where it may be more fully exposed to air currents created by forward movement of the vehicle, the liquid fuel in the auxiliary vessel is somewhat protected against high temperature conditions, which normally exist in the vicinity of the engine, thereby reducing the possibility of vaporization of the liquid fuel contained by the vessel.

Should vaporization occur in the second conduit section or in the pump chambers, these vapors, escaping into the vessel through the outlet 24, will bubble up through the liquid fuel therein and may be relieved through the first conduit section without substantially affecting the volume of fuel retained in the auxiliary vessel. Even though introduction of vapors into the first conduit section may produce some partial evacuation of liquid fuel from the first conduit section into the storage tank 5, the vessel 21 will retain a sufficient volume of liquid fuel so that upon restarting the engine, and thereby action of the pump, liquid fuel is readily available for supply to the carburetor during the brief period required to refill the first conduit section from the storage tank, and to replenish the auxiliary vessel. Normally, and dependent upon the volume demand of the pump, and on the storage capacity of the carburetor, the capacity of the auxiliary vessel may be in the range of from about 100 to about 1000 cubic centimeters. In a typical installation, the capacity would be from about 200 to about 500 cc. Capacities in excess of those required effectively to overcome vapor lock are to be avoided, so that fuel degradation by storage at high temperatures may not occur. In any event, however, the volumetric capacity of the auxiliary vessel 21 should be greater than that of the pump 8 plus the conduit connection 12.

A still more specific function of the auxiliary storage vessel may be discovered in the situation where, after an extended period during which the engine has been idling, and in which incipient vapor-lock conditions may have developed in the pump and in the second conduit connection, the vehicle is suddenly put into motion. With a conventional conduit connection between the storage tank and the pump, the combination of an incipient vapor-lock condition, and the inertial effect of a sudden start on liquid present in the delivery conduit, would tend to restrict the liquid fuel available to the pump, thereby aggravating the existing vapor-lock conditions. In the system according to the present invention, however, the inertial effect on the liquid fuel retained in the auxiliary storage vessel tends to move the fuel with a slight positive pressure through the funnel-shaped end of the vessel, and the outlet connection thereof, into the communicating second conduit connection between the vessel and the pump. By this action an adequate supply of liquid fuel is delivered to the pump, and the previously existing incipient vapor-lock conditions substantially are overcome.

Although for the purpose of illustration, the nature and operation of the conduit system for delivering the liquid fuel from a storage tank to a fuel pump has been illustrated and described in its application to an automobile, the system is not intended to be restricted to such use. Vapor-lock conditions also may be generated in other types of automotive vehicles, and the inertial effect of sudden starts or rapid acceleration can also be of substantial concern in connection with the use and operation of marine engines as employed to propel high-speed boats. It is contemplated that the fuel delivery conduit system disclosed may be usefully employed under any circumstances where vapor-lock conditions and/or the inertial effects described may be found to exist. Furthermore, although a system has been described in which the auxiliary fuel storage vessel preferably is located forwardly of the fuel pump to which it is connected, within the limits wherein the inertial effect on liquid fuel in the auxiliary fuel storage vessel favors delivery of liquid fuel to the fuel pump, this vessel may be located ahead of, in line with, or rearwardly of the fuel pump. Similarly, while the detailed description has been based on a system wherein the main liquid fuel storage vessel is located in the rear of the vehicle, and the engine, fuel pump, and auxiliary fuel storage vessel in the forward portion of the vehicle, these components may be otherwise arranged without departing from the scope of the invention. Thus, the main fuel storage vessel, auxiliary fuel storage vessel, fuel pump, and engine may all be located in the rear portion of the vehicle, provided only that under conditions of forward acceleration the inertial effect on the liquid fuel in the auxiliary fuel storage vessel favors delivery of liquid fuel to the fuel pump.

What is claimed is:

1. In an automotive vehicle, having forward and rearward ends, and including a liquid fuel pump, having a suction inlet, and a main liquid fuel storage tank, having an outlet connection, a conduit system for delivering liquid fuel from said tank to said pump, comprising an auxiliary fuel storage vessel disposed forwardly of both said tank and said pump and having an axis substantially aligned with the longitudinal axis of said vehicle; an inlet connection to said vessel in an upper portion thereof; a first conduit section connected in liquid delivery communication between said tank outlet connection and said vessel inlet connection; an outlet connection opening from said vessel at a level substantially below said vessel inlet connection, said outlet connection extending from said vessel toward the rearward end of said vehicle, in substantially parallel relation to said vessel axis; and a second conduit section connected in liquid delivery communication between said vessel outlet connection and said pump inlet.

2. A conduit system according to claim 1, wherein the said auxiliary storage vessel has a liquid storage capacity substantially greater than the combined volumetric capacity of said pump and said seocnd conduit section.

3. A conduit system according to claim 2, wherein the volumetric capacity of said auxiliary vessel is in the range of from about 100 to about 1000 cubic centimeters of liquid.

4. A conduit system according to claim 2, wherein the volumetric capacity of said auxiliary storage vessel is in the range of from about 200 to about 500 cc.

5. In an automotive vehicle, including a liquid fuel pump, having a liquid fuel inlet, and a fuel storage tank, positioned rearwardly of said pump, a conduit system for delivering liquid fuel from said tank to said pump, comprising an auxiliary fuel storage vessel disposed forwardly of said tank, and having a longitudinal axis substantially aligned with the longitudinal axis of said vehicle; a rearward end portion on said vessel, said end portion defining a funnel-like extension opening at its wider end from the vessel adjacent the bottom and terminating at its narrow end in a fuel outlet connection port; a fuel inlet connection opening through an upper wall portion of said vessel; a first conduit section connected in liquid delivery communication between said tank and said vessel inlet connection; and a second conduit section connected in fuel delivery communication between said vessel outlet connection port and said pump inlet.

References Cited in the file of this patent

UNITED STATES PATENTS 2,120,779     Ericson _____ June 14, 1938